(12) United States Patent
Hirota (10) Patent No.: US 7,319,434 B2
(45) Date of Patent: Jan. 15, 2008

(54) ELECTRONIC EQUIPMENT (75) Inventor: Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 11/359,367

(22) Filed: Feb. 23, 2006

(65) Prior Publication Data

US 2006/0187129 A1    Aug. 24, 2006

(30) Foreign Application Priority Data

Feb. 24, 2005  (JP) .......................... P2005-048602

(51) Int. Cl.
*H01Q 1/24* (2006.01)

(52) U.S. Cl. ...................... 343/702; 343/846
(58) Field of Classification Search ............... 343/702, 343/700 MS, 846
See application file for complete search history.

(56) References Cited

U.S. PATENT DOCUMENTS

| | | | |
|---|---|---|---|
| 6,016,126 A | * | 1/2000 | Holshouser ................. 343/702 |
| 6,545,642 B1 | * | 4/2003 | Doub et al. .................. 343/702 |
| 2004/0041734 A1 | * | 3/2004 | Shiotsu et al. .............. 343/702 |

FOREIGN PATENT DOCUMENTS

JP    2001-022904    1/2001

* cited by examiner

*Primary Examiner*—Hoang V. Nguyen
(74) *Attorney, Agent, or Firm*—Pillsbury Winthrop Shaw Pittman LLP (57) ABSTRACT According to one embodiment, an electronic equipment includes a keyboard unit having a metal plate, and a plurality of keys arranged on the metal plate, and an antenna member which is provided at a position above the metal plate of the keyboard unit and inside the arranged keys. The metal plate serves as a ground of the antenna member.

11 Claims, 6 Drawing Sheets

TO WIRELESS COMMUNICATION MODULE

FIG. 4

TO WIRELESS COMMUNICATION MODULE

ELECTRONIC EQUIPMENT

CROSS-REFERENCE TO RELATED APPLICATIONS

This application is based upon and claims the benefit of priority from the prior Japanese Patent Applications No. 2005-048602, filed on Feb. 24, 2005; the entire contents of which are incorporated herein by reference.

BACKGROUND

1. Field

One embodiment of the invention relates to an electronic equipment which has an input device with a plurality of keys arranged on a metal plate and enables wireless communication, and more particularly, to the layout of an antenna at a position closer to arranged keys rather than to the metal plate of the input device.

2. Description of the Related Art

In recent years, a wireless LAN has penetrated the market as the form of a network to replace a related-art wired LAN in a network environment such as an office. In addition to the wireless LAN, an increasing number of pieces of equipment transmit and receive data through wireless communication in place of the connection between pieces of equipment using a related-art wire. When such an antenna for wireless communication purpose is laid out, placing the antenna at a highest-possible location is desirable, in view of enhancement of sensitivity to transmission and receipt of a signal.

However, portable compact electronic equipment, such as a notebook personal computer and a PDA (Personal Digital Assistant), has limited space for laying out an antenna. A layout method for forming an antenna in an overlapping manner at a position below a keyboard unit has been conceived (see, e.g., Japanese Patent Application (KOKAI) No. 2001-22904 (pg. 2, and FIG. 1)).

However, in a related-art device, an antenna is formed at a position where the antenna overlaps the keyboard unit. Consequently, when a plurality of antennas are laid out, difficulty is raised in communication, because the plurality of antennas overlap each other, or there is no alternative but to lay out the plurality of antennas while some distance is provided among the antennas, which may in turn pose difficulty in attaining thickness reduction of the electronic equipment. In addition, there is a risk of a limitation being imposed on the number of antennas to be laid out.

The present invention has been conceived in view of the circumstance and aims at providing electronic equipment which enables laying out of antennas in a keyboard unit having a plurality of keys without involvement of an additional space dedicated to laying out the antenna.

SUMMARY

According to an embodiment of the invention, an electronic equipment includes a keyboard unit having a metal plate, and a plurality of keys arranged on the metal plate; and an antenna member which is provided at a position above the metal plate of the keyboard unit and inside the arranged keys, wherein the metal plate acts as a ground of the antenna member.

According to an embodiment of the invention, an electronic equipment includes a keyboard unit having a metal plate, and a plurality of keys arranged on the metal plate; and an antenna member provided at a position, above the metal plate of the keyboard unit, where the plurality of keys are not arranged, wherein the metal plate acts as a ground of the antenna member.

According to an embodiment of the invention, an electronic equipment includes a main body section; a display section connected pivotally to the main body section; a keyboard unit which is provided in the main body section and has a metal plate, and a plurality of keys arranged on the metal plate; and an antenna member which is provided at a position above the metal plate of the keyboard unit and within or adjacent to the arranged keys, wherein the metal plate acts as a ground of the antenna member.

According to an embodiment of the invention, antennas can be mounted in a keyboard unit having a plurality of keys without involvement of a dedicated, additional antenna mount space.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
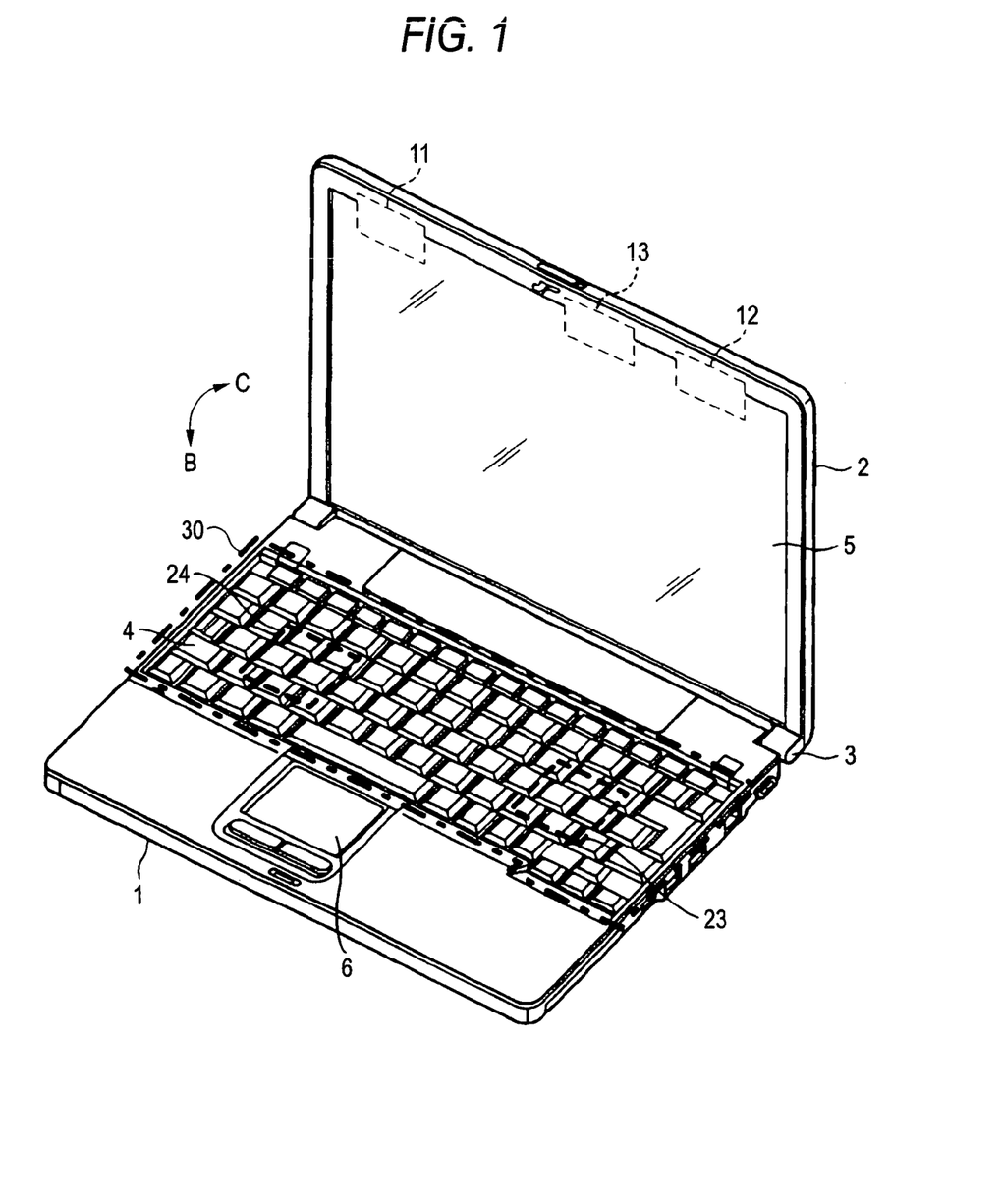
FIG. 1 is an exemplary perspective view of a notebook personal computer A serving as electronic equipment of the present invention according to an embodiment of the invention.

An embodiment of the present invention will be described in detail hereinbelow by reference to the drawings. FIG. 1 is a perspective view of electronic equipment of the present embodiment. In the present embodiment, the electronic equipment is embodied in the form of, e.g., a notebook personal computer A. This notebook personal computer A is electronic equipment capable of performing first wireless communication using a wireless LAN of an IEEE802.11b scheme, and second wireless communication complying with Bluetooth (Registered Trademark, and hereinafter called "BT").

IEEE802.11b is one of wireless communication standards using an ISM (Industry Science Medical) band of a 2.4 GHz range; employs Direct Sequence Spread Spectrum (DSSS) as a spectrum spread method; and enables communication at a maximum communication speed of 11 Mbps.

BT is wireless communication complying with a short-range wireless communication standard (e.g., Bluetooth Ver. 1.2 standard). BT implements wireless communication within 10 m (a maximum of 100 m) using an ISM (Industry Science Medical) band of a 2.4 GHz range. BT enables connection of a maximum of eight devices as a single group (pico-net) by means of a time-division multiplexing scheme, at a maximum communication speed of 1 Mbps using a frequency hopping scheme (FHSS: Frequency Hopping Spread Spectrum) as the spectrum spreading scheme.

The notebook personal computer A shown in FIG. 1 has a main body case 1 and a display section case 2. The main body case 1 and the display section case 2 are connected together in a pivotable manner byway of a hinge section 3. A keyboard unit 4 is incorporated into an upper face section of the main body case 1 such that arranged keys are exposed outside. A touch pad 6 is further provided in the upper face section of the main body case 1.

A display region of a display device consisting of an LCD 5 (Liquid Crystal Display) is incorporated into the display section case 2 so as to come to essentially the center of the display section case 2. The display section case 2 is pivotable in a direction of arrow B-C byway of the hinge section 3, between a closed position where the arranged keys of the keyboard unit 4 are covered with the display section case 2, and an open position where the arranged keys of the keyboard unit 4 are available.

Diversity antennas 11, 12 used for the wireless LAN (IEEE802.11) and a BT antenna 13 used for BT (the respective antennas are indicated by dotted lines in the drawings) are provided along an upper side portion of the display section case 2 which supports the LCD (Liquid-Crystal Display) 5.

When a diversity antenna used for a diversity scheme is constructed, the distance between the antennas 11, 12 is usually set to a value of ¾λ (λ: a wavelength) or more. In the present embodiment, the locations where the diversity antennas 11, 12 are arranged are spaced apart from each other by ¾λ or more. In the present embodiment, each of the diversity antennas 11, 12 is formed from an inverted type-F antenna. Meanwhile, the BT antenna uses a single antenna, and is constructed of, e.g., an inverted type-F antenna, a mono-pole antenna, or the like.

In order to enhance receiving sensitivity, the radio antenna is ideally placed at an elevated position. To this end, the diversity antennas 11, 12 and the antenna 13 are provided along an upper portion of the display section case 2, which comes to an elevated position when the computer is in use, in consideration of a circumstance where the notebook personal computer A is used.

The respective antennas 11 to 13 are connected to an unillustrated wireless LAN (first wireless communication) module 21 and a BT (second wireless communication) module 22, by means of an unillustrated coaxial cable. The wireless LAN module 21 and the BT module 22 can be provided on the back of the LCD 5 within the display section case 2 or on a circuit board within the main body case 1.

This notebook personal computer A is electronic equipment which enables additional third and fourth wireless communication. As mentioned previously, although the radio antenna is ideally placed at an elevated position, the antennas 11 to 13, which are to be used for the first and second wireless communication, have already been provided along the upper side portion of the display section case 2.

Accordingly, in the notebook personal computer A shown in FIG. 1, antennas 14, 15, . . . , 18 (all of which are not shown) used for third and fourth wireless communication are provided within the keyboard unit 4 (within the area 30 indicated by a dashed line shown in the drawing) incorporated in the main body case 1. The layouts and positions of the antennas within the keyboard unit 4 will be described later.

The respective antennas 14, 15, . . . , 18 are connected to third and fourth wireless communication modules 23, 24 (indicated by thick lines in the drawings) provided on the circuit board in the main body case 1, by means of an unillustrated coaxial cable.

Figure 2:
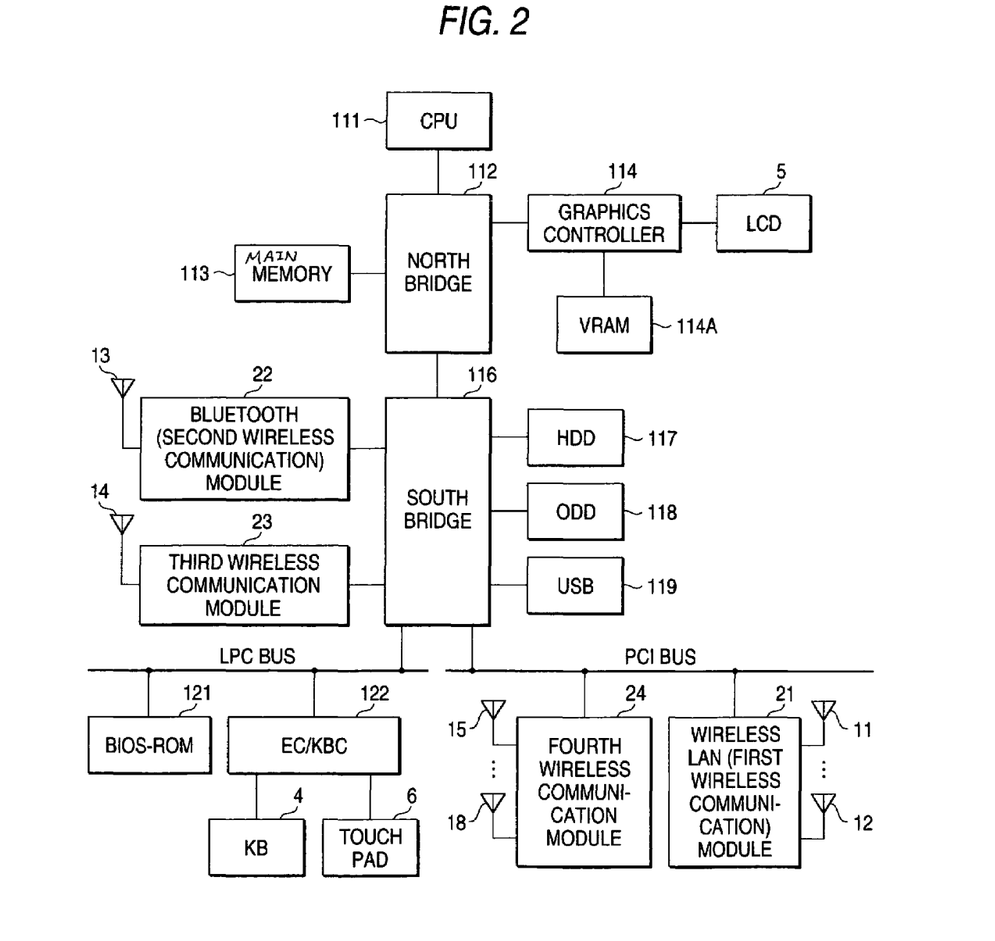
FIG. 2 is an exemplary block diagram showing the system configuration of the notebook personal computer A according to an embodiment of the invention.

By reference to FIG. 2, the system configuration of the notebook personal computer A will be described. As shown in FIG. 2, the notebook personal computer A includes a CPU 111; a north bridge 112; main memory 113; a graphic controller 114; the LCD 5; a south bridge 116; a hard disk drive (HDD) 117; an optical disk drive (ODD) 118; a USB (Universal Serial Bus) controller 119; the wireless LAN module 21; the BT module 22; the third wireless communication module 23; the fourth wireless communication module 24; BIOS-ROM 121; an embedded controller/keyboard controller IC (EC/KBC) 122; and the like.

The CPU 111 is a processor provided for controlling operation of the personal computer A, and executes programs loaded into the main memory 113 from the hard disk drive (HDD) 117. The CPU 111 also executes a system BIOS (Basic Input Output System) stored in the BIOS-ROM 121. The system BIOS is a program for controlling hardware.

The north bridge 112 is a bridge device for connecting a local bus of the CPU 111 to the south bridge 116. The north bridge 112 also has the function of establishing communication with the graphics controller 114 by way of an AGP (Accelerated Graphics Port) bus, or the like.

The graphics controller 114 is a display controller for controlling the LCD 5. This graphics controller 114 generates a display signal to be transmitted to the LCD 5 from the video data written in video memory (VRAM) 114A. The south bridge 116 controls devices connected to an LPC (Low Pin Count) bus and devices connected to a PCI (Peripheral Component Interconnect) bus.

The south bridge 116 has a built-in IDE (Integrated Drive Electronics) controller for controlling the HDD 117 and the ODD 118. Further, the south bridge 116 has the function of controlling an access to the USB controller 119 and the function of controlling the second and third wireless communication modules 22, 23.

The HDD 117 is a storage device for storing various types of software and data. The ODD 118 is a drive unit for driving storage media; e.g., a DVD, a CD, and the like. The USB controller 119 is a bus interface for connecting the present computer 10 to peripheral devices complying with the USB standard.

The embedded controller/keyboard controller IC (EC/KBC) 122 is a one-chip microcomputer into which are integrated an embedded controller (EC) for power management and a keyboard controller (KBC) for controlling the keyboard unit (KB) 4 and the touch pad 6. The BIOS-ROM 121 stores a BIOS. This BIOS is a program for controlling hardware components in the system.

The wireless LAN module 21 is for modulating/demodulating radio data complying with the IEEE802.11b standard. The wireless LAN module 21 is compatible with the diversity communication scheme using a plurality of antennas provided indifferent positions. The wireless LAN module 21 is connected to the diversity antennas 11, 12 which serve as interfaces for receiving or transmitting a radio signal by way of an unillustrated coaxial cable.

According to the diversity scheme, all antennas have the transmission-and-receipt functions. During receiving operation, fluctuations in the level of a received radio wave are minimized by use of an antenna having a higher receiving level, in a switching manner. During transmission operation, the antenna that has exhibited the highest sensitivity during the previous receiving operation is used.

The BT module 22 performs operation for modulating/demodulating a signal of radio data complying with the BT communication scheme, frequency hopping control operation, and the like. The BT module 22 is connected to the BT antenna 13, which serves as an interface for transmitting and receiving a radio signal by way of an unillustrated coaxial cable.

The third wireless communication module 23 performs operation for modulating/demodulating a signal of radio data complying with the third communication scheme. Like the previously-described BT, the third communication scheme is for effecting wireless communication by use of a single antenna. The third wireless communication module 23 is connected to the antenna 14, which serves as an interface for transmitting and receiving a radio signal by way of an unillustrated coaxial cable. As will be described later, the antenna 14 is provided within the keyboard unit 4 (within the area 30) of the main body case 1.

The fourth wireless communication module 24 is for modulating/demodulating a signal of radio data complying with the fourth communication scheme. Like the previously-described IEEE802.11b of the diversity scheme, the fourth communication scheme is for performing wireless communication operation by use of a plurality of antennas. The fourth wireless communication module 24 is connected to the plurality of antennas 15, . . . , 18, which serve as the interfaces for transmitting and receiving the radio signal by way of the unillustrated coaxial cable. As will be described later, the plurality of antennas 15, . . . , 18 are provided within the keyboard unit 4 (within the area 30) of the main body case 1.

By mean of the above-described system configuration, the wireless communication complying with BT, IEEE802.11b, and the third and fourth wireless communication schemes can be established with external wireless communication equipment. In the present embodiment, the antennas 11, 12, and 13 for use with BT and IEEE802.11b are arranged in the display section case 2. However, the location is not limited to the display section case 2. The antennas can also be arranged within the keyboard unit 4 of the main body case 1.

The layouts of the antennas in the mount area 30 of the keyboard unit 4 will now be described by use of FIGS. 3 to 5. Although the present embodiment is described by reference to a patch antenna, the antenna structure is not limited to the patch antenna. Although the present embodiment is described by use of the keyboard unit including keys which are formed with a pantograph mechanism, the mechanism and layout of the key are not limited to those mentioned above.

Figure 3:
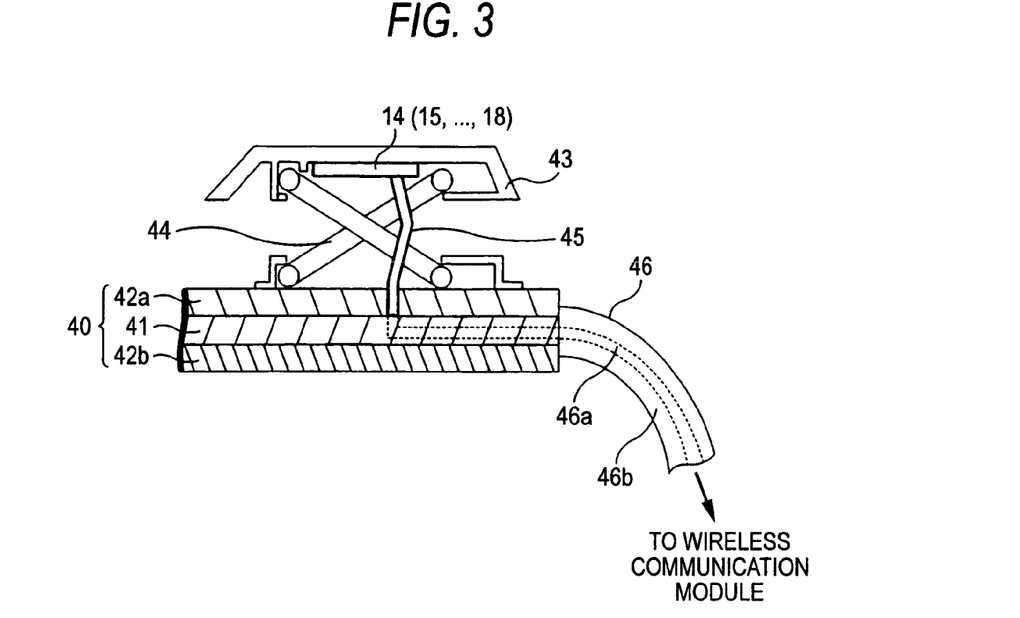
FIG. 3 is an exemplary cross-sectional view showing the structure of the antenna provided on the key of the keyboard unit 4 according to an embodiment of the invention.

FIG. 3 is a cross-sectional view showing the structure of the key and that of the antenna, both of which are provided in the keyboard unit 4. The keyboard unit 4 shown in FIG. 3 has a frame plate 40 formed from a circuit layer 41 for the keyboard unit 4. This frame plate 40 is formed by stacking a first metal plate 42a on an upper face of the circuit layer 41, and a second metal plate 42b on a lower surface of the circuit layer 41 (the plates 42a and 42b will here in after be collectively a "plate 42").

Each of the keys provided in the keyboard unit 4 has a key top 43 which is to be contacted by a user and is made from plastic. The key top 43 is retained on the frame plate 40 so as to vertically move by way of a pantograph 44. A plurality of keys, which are configured as mentioned above, are arranged in a predetermined layout on the frame plate 40 of the keyboard unit 4.

The antenna 14 (15, . . . , 18) is attached to the back side (an unexposed lower surface side) of the key top 43. The antenna 14 (15, . . . , 18) provided on the back of the key top 43 is connected to the circuit layer 41 by way of a feeder 45. A signal line 46a of the coaxial cable 46 connected to any of the corresponding wireless communication modules (21 to 24) is connected to the feeder 45 provided on the circuit layer 41. A coaxial ground 46b of the coaxial cable 46 is connected to the first or second metal plate 42. Thereby, the metal plate 42 connected to the coaxial ground 46b serves as an antenna ground.

The feeder 45 provided on the circuit layer 41 is formed as being sandwiched, while remaining impedance-matched, between the metal plates 42 serving as the antenna ground. FIG. 3 is a view showing a cross section acquired when the coaxial ground 46b is connected to the first, second metal plates 42a, 42b serving as the antenna ground. When the plurality of antennas 14 (15, . . . , 18) are attached onto the keyboard unit 4, the metal plates 42 serving as the antenna ground may be unified to either one of the two metal plates.

This feeder 45 is formed from a soft material so as to follow vertical action of the key top 43 performed by the user. Specifically, when the key is not used, the feeder 45 remains in an extended state as shown in FIG. 3. When the user has pressed the key top, the feeder 45 may become crimped.

Figure 4:
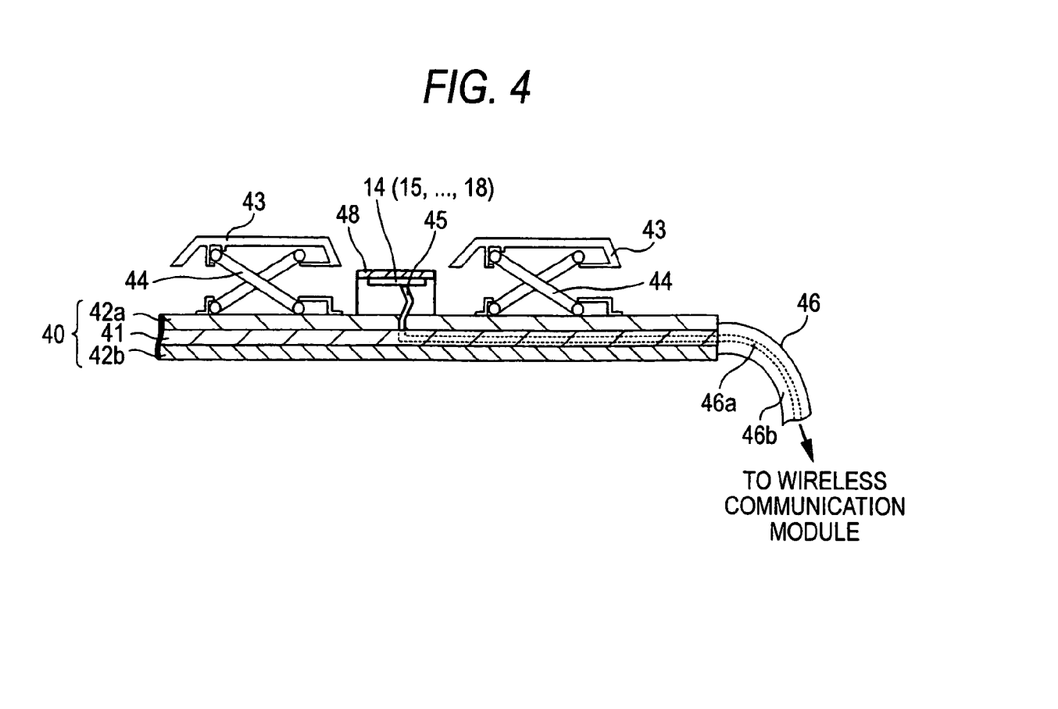
FIG. 4 is an exemplary cross-sectional view of the keyboard unit 4 when an antenna is provided on a plastic section 48 placed in an area on the keyboard unit 4 where no keys are formed according to an embodiment of the invention.

FIG. 4 is a cross-sectional view of the keyboard unit 4 when the antennas are provided in a plastic section 48 defined in the area on the keyboard unit 4 where no keys are formed. As shown in FIG. 4, in the keyboard unit 4, a plurality of key tops 43 are provided on the frame plate 40 by way of the pantographs 44. Depending on the layout of the keys, the keyboard unit 4 has areas, where plastic plates 48 are placed, between the keys where no keys are provided.

The antenna 14 (15, . . . , 18) is attached to a back side (an unexposed lower surface side) of the plastic plate 48. The antenna 14 (15, . . . , 18) provided on the back of the plastic plate 48 is connected to the circuit layer 41 by way of the feeder 45. The signal line 46a of the coaxial cable 46 connected to any of the corresponding wireless communication modules (21 to 24) is connected to the feeder 45 on the circuit layer 41. Further, the coaxial ground 46b of the coaxial cable 46 is connected to either the first or second metal plate 42. Thereby, the metal plate 42 connected to the coaxial ground 46b serves as the antenna ground.

The plastic plate 48 is configured so as not to move vertically. Accordingly, the material of the feeder 45 may be a soft material similar to that described in connection with the embodiment shown in FIG. 3, or a hard material differing from that described in connection with the embodiment shown in FIG. 3. In the keyboard unit 4 shown in FIG. 4, the feeder 45 is connected as an antenna ground to the first metal plate 42a, and the feeder 45 is formed from a soft material similar to that described in connection with the embodiment shown in FIG. 3.

Figure 5:
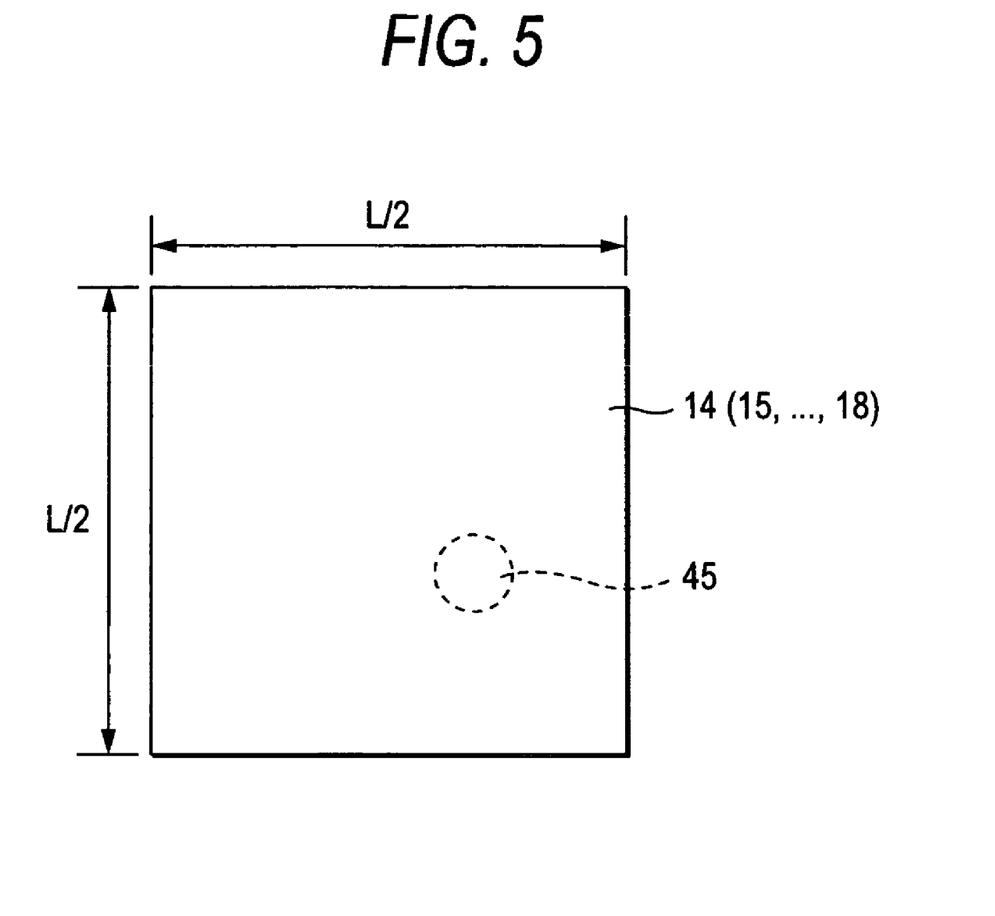
FIG. 5 is an exemplary view showing the shape of an antenna 14 (15, . . . , 18) according to an embodiment of the invention.

FIG. 5 is a view showing the shape of the antenna 14 (15, . . . , 18). As shown in FIG. 5, the antenna 14 (15, . . . , 18) is usually formed such that one side thereof assumes a length of L/2 (L designates a wavelength). The key is usually formed such that one side thereof assumes a size of 15 to 20 mm. Accordingly, the shape (length, thickness, structure, and the like) of the antenna and a relationship (a layout, a mounting method, an incorporation method, and the like) between the antenna and a dielectric substance are adjusted such that the antenna fits the size of the key and becomes compatible with a desired frequency (e.g., 1.5 GHz for a GPS and 12 GHz for a BSCS). Although the present embodiment has described the patch antenna, a mono-pole antenna, an inverted type-F antenna, or the like, can also be used in the present embodiment according to the shape of the antenna.

The key top 43 provided with the antenna 14 (15, ... 18) is a dielectric substance. Consequently, according to the dielectric constant of the key top 43, wavelength compaction arises in the antenna 14 (15, ..., 18). Further, the wavelength compaction arising in the antenna 14 (15, ..., 18) is further changed as a result of the user touching the key top 43. As a result of the user pressing the key top 43, changes arise in the characteristic of the antenna 14 (15, ..., 18).

Figure 6:
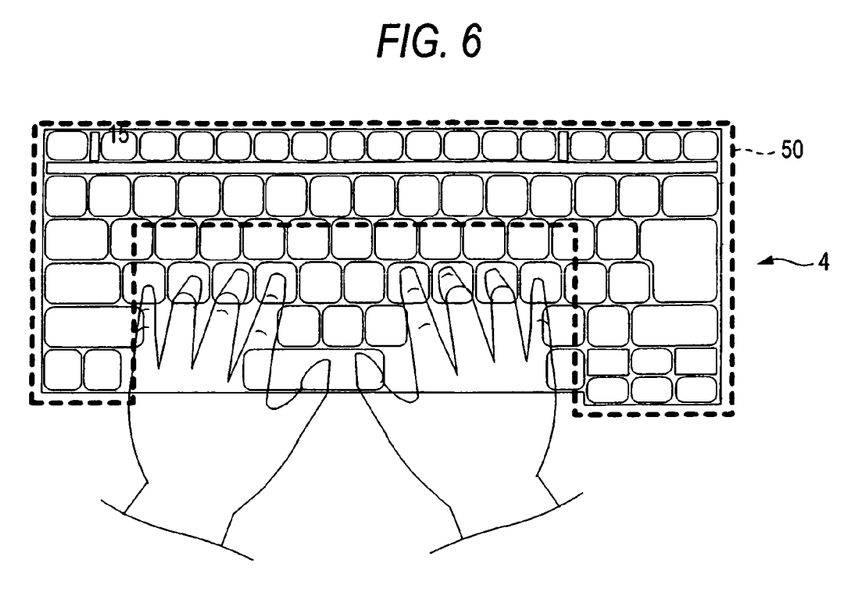
FIG. 6 is an exemplary view for describing areas on the keyboard unit 4 which is less-frequently touched by a user according to an embodiment of the invention.

Accordingly, in a case where the antenna 14 (15, ..., 18) is attached to the inside the keyboard unit 4, arranging the antenna 14 (15, ..., 18) in an area where the user less frequently touches/presses when the user operates the keyboard unit 4 is more effective. In the present embodiment, arranging the antenna 14 (15, ..., 18) in an area 50 (illustrated by dotted lines) in the keyboard unit 4 shown in FIG. 6 is desirable.

For instance, the keyboard unit 4 has, in the area 50, a key group 51 which is provided in the topmost row and assigned functions; a key group 52 which his provided in the second row and assigned numerical functions; key groups 55, 56 which are provided on respective sides of the keyboard unit and assigned special functions such as shifting functions and the like; and locations 53, 54 where the plastic plates 48 are provided. Consequently, placing the antennas in the key groups 51, 52, 55, and 56 and the locations 53, 54 of the plastic plates is effective.

Figure 7:
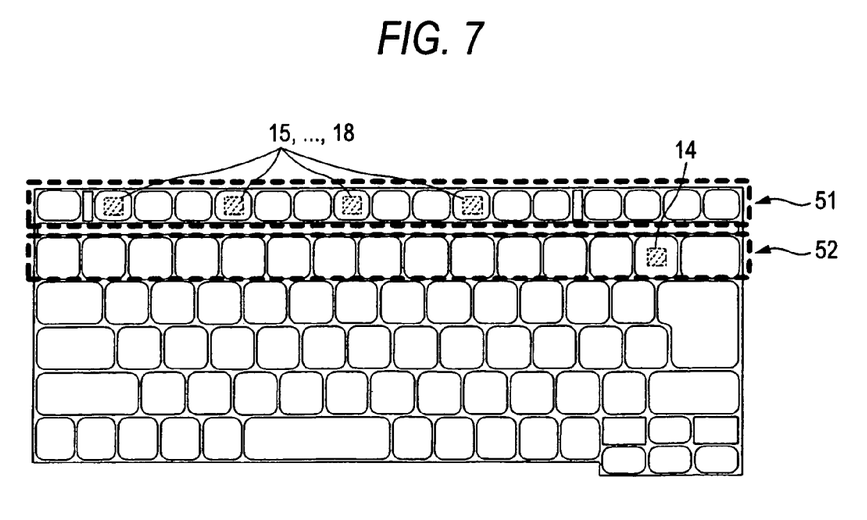
FIG. 7 is an exemplary view for describing an example layout of the antenna 14 (15, . . . , 18) within the area 50 according to an embodiment of the invention.

An example layout of the antenna 14 (15, ..., 18) in the area 50 will now be described by reference to FIGS. 7 through 9. In the keyboard unit 4 shown in FIG. 7, the antenna 14 (15, ..., 18) is provided at the location of the key group 51 placed in the topmost row and the location of the key group 52 in the second top row.

Figure 8:
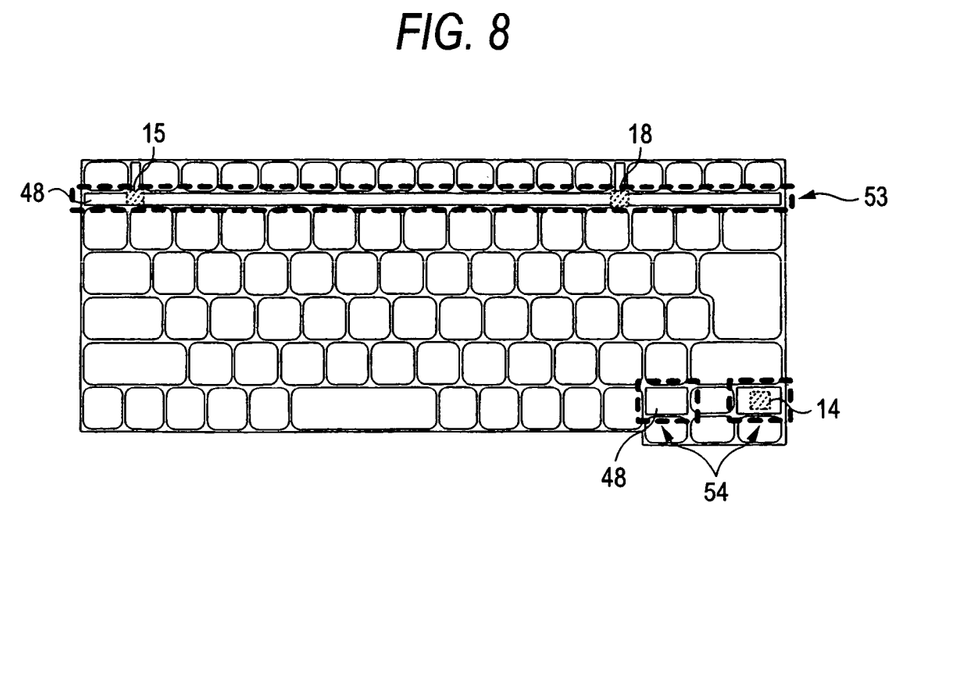
FIG. 8 is an exemplary view for describing an example layout of the antenna 14 (15, . . . , 18) within the area 50 according to an embodiment of the invention.

In the key board unit 4 shown in FIG. 8, the antenna 14 (15, ..., 18) is placed in the location 53 on the plastic plate 48 between the key group 51 in the topmost row and the key group 52 in the second top row, as well as in the location 54 on the plastic plate 48 provided in the right-side key group 56.

Figure 9:
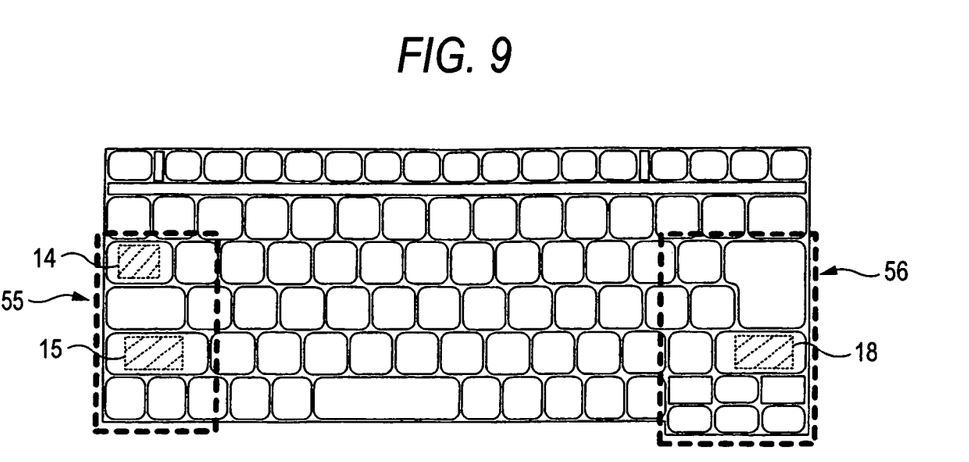
FIG. 9 is an exemplary view for describing an example layout of the antenna 14 (15, . . . , 18) within the area 50 according to an embodiment of the invention.

The antenna 14 (15, ..., 18) is provided in the key groups 55, 56 on both sides of the keyboard unit 4 shown in FIG. 9. As shown in FIG. 9, when an inverted type-F antenna is attached as a diversity antenna to the antenna 15, ..., 18, attaching the antenna to a plurality of larger keys provided on both sides of the key groups 55, 56 is effective.

As has been described above, the antennas 14, 15, ..., 18 are provided within the keyboard unit 4 incorporated in the main body case 1. Alternatively, the antenna 14 (15, ..., 18) is attached to a key in the keyboard unit 4, the key being less frequently used (or touched) or provided in an area which is not used (or touched) by the user during key operation.

Even when a plurality of antennas, such as an array antenna, are mounted, the mounting of an antenna in the area of the input device formed from a plurality of keys is enabled without addition of a dedicated antenna mounting space. Moreover, a receiving level can be increased by selectively controlling an arrayed antenna without moving the antenna.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic equipment comprising:
a keyboard unit having a metal plate, and a plurality of keys arranged on the metal plate; and
an antenna member which is provided at a position above the metal plate of the keyboard unit and inside the arranged keys, wherein
the metal plate serves as a ground of the antenna member.

2. The electronic equipment according to claim 1, wherein
each of the keys arranged on the keyboard unit has a key top section which has a contact section to be touched by a user and is made from plastic, and
a part or entirety of the antenna member is mounted on a back side of the contact section of the key top section.

3. The electronic equipment according to claim 1, wherein
each of the keys arranged on the keyboard unit has a key top section which has a first surface to be touched by a user and is made from plastic, and
a part or entirety of the antenna member is mounted on a second face of the key top section, the second face being opposite to the first face of the key top section.

4. The electronic equipment according to claim 1, wherein
the antenna member is provided inside each of two or more keys of the plurality of keys, and
an arrayed antenna is formed from a plurality of the antenna members.

5. An electronic equipment comprising:
a keyboard unit having a metal plate, and a plurality of keys arranged on the metal plate; and
an antenna member provided at a position, above the metal plate of the keyboard unit, where the plurality of keys are not arranged, wherein the metal plate serves as a ground of the antenna member, wherein
the keyboard unit has a plastic plate which is located above the metal plate and side by side with the arranged keys, and the antenna member is provided at a position above a metal plate of the keyboard unit and inside the plastic plate.

6. The electronic equipment according to claim 5, wherein
the antenna member is provided in a number greater than one, and
an arrayed antenna is formed from the plurality of antenna members.

7. The electronic equipment according to claim 5, wherein
the antenna member is provided in a number greater than one, and a diversity antenna is formed from the plurality of antenna members.

8. An electronic equipment comprising:

a main body section;

a display section connected pivotally to the main body section;

a keyboard unit which is provided in the main body section and has a metal plate, and a plurality of keys arranged on the metal plate; and an antenna member which is provided at a position above the metal plate of the keyboard unit and inside or adjacent to the arranged keys, wherein the metal plate serves as a ground of the antenna member, and wherein each of the keys arranged on the keyboard unit has a key top section which is made from plastic and has a first face to be touched by a user, and a part of or the entirety of the antenna member is mounted on a second face of the key top section, the second face being opposite to the first face of the key top section.

9. The electronic equipment according to claim 8, wherein each of the keys arranged on the keyboard unit has a key top section which is made from plastic and has a contact section to be touched by a user, and a part of or the entirety of the antenna member is mounted on a back side of the contact section of the key top section.

10. The electronic equipment according to claim 8 wherein the antenna member is provided inside each of two or more keys of the plurality of keys, and an arrayed antenna is formed from the plurality of antenna members.

11. The electronic equipment according to claim 8 wherein the antenna member is provided inside two or more keys of the plurality of keys, and a diversity antenna is formed from the plurality of antenna members.

* * * * *